United States Patent
Russell, III

[11] Patent Number: 5,961,075
[45] Date of Patent: Oct. 5, 1999

[54] UNIVERSAL AIRCRAFT-CARRIAGE SUSPENSION LUG SYSTEM

[75] Inventor: Samuel W. Russell, III, Green Valley, Ariz.

[73] Assignee: Raytheon Company, Lexington, Mass.

[21] Appl. No.: 08/960,959

[22] Filed: Oct. 30, 1997

[51] Int. Cl.⁶ ................ B64D 1/12; B64D 1/04
[52] U.S. Cl. .................... 244/137.4; 89/1.51
[58] Field of Search .................. 89/1.51, 1.53, 89/1.54, 1.56, 1.57, 1.58, 1.59; 244/137.4; 102/293

[56] References Cited

U.S. PATENT DOCUMENTS

| | | | |
|---|---|---|---|
| 2,852,981 | 9/1958 | Caya | 89/1.51 |
| 2,869,916 | 1/1959 | Benson | 89/1.51 |
| 3,181,908 | 5/1965 | Clark | 89/1.51 |
| 4,842,218 | 6/1989 | Groutage et al. | 244/137.4 |
| 4,917,526 | 4/1990 | Paterson | 89/1.57 |
| 5,056,408 | 10/1991 | Joner et al. | 89/1.51 |

*Primary Examiner*—Harold J. Tudor
*Assistant Examiner*—Theresa M. Wesson
*Attorney, Agent, or Firm*—David W. Collins; Andrew J. Rudd; Glenn H. Lenzen, Jr.

[57] ABSTRACT

A suspension lug system for use with a jettisonable weapon that provides a mechanical interface between the weapon and a multiplicity of aircraft. The system has a dual-function lug that is disposed in a well when it is in a stowed position, and that is pivotable in opposite directions on a transverse pivot pin. A first end of the lug is configured as a saddle lug that is exposed above the outer surface when the lug is rotated into a saddle-deployed position. The second end of the lug is configured as a clevis that is exposed above an outer surface of the system when the lug is rotated into a clevis-deployed position. A spring is coupled to the lug that spring loads it and returns it to a stowed position when it is not engaged with the ejector release unit to preserve the outer contour of the weapon.

5 Claims, 4 Drawing Sheets

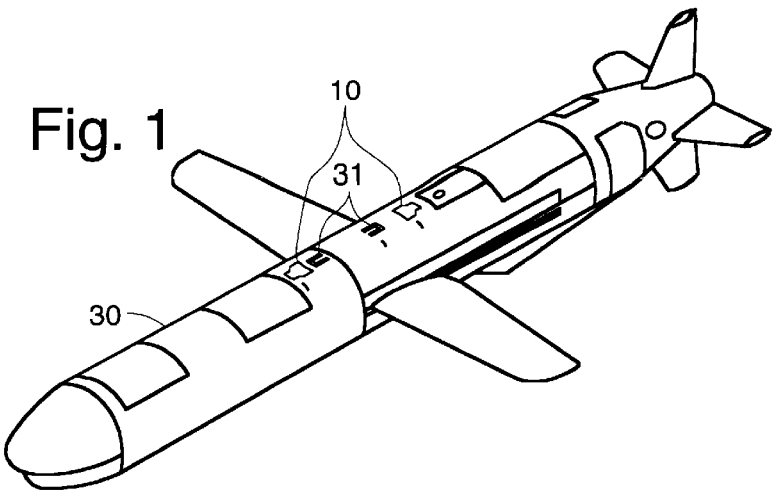
Fig. 1
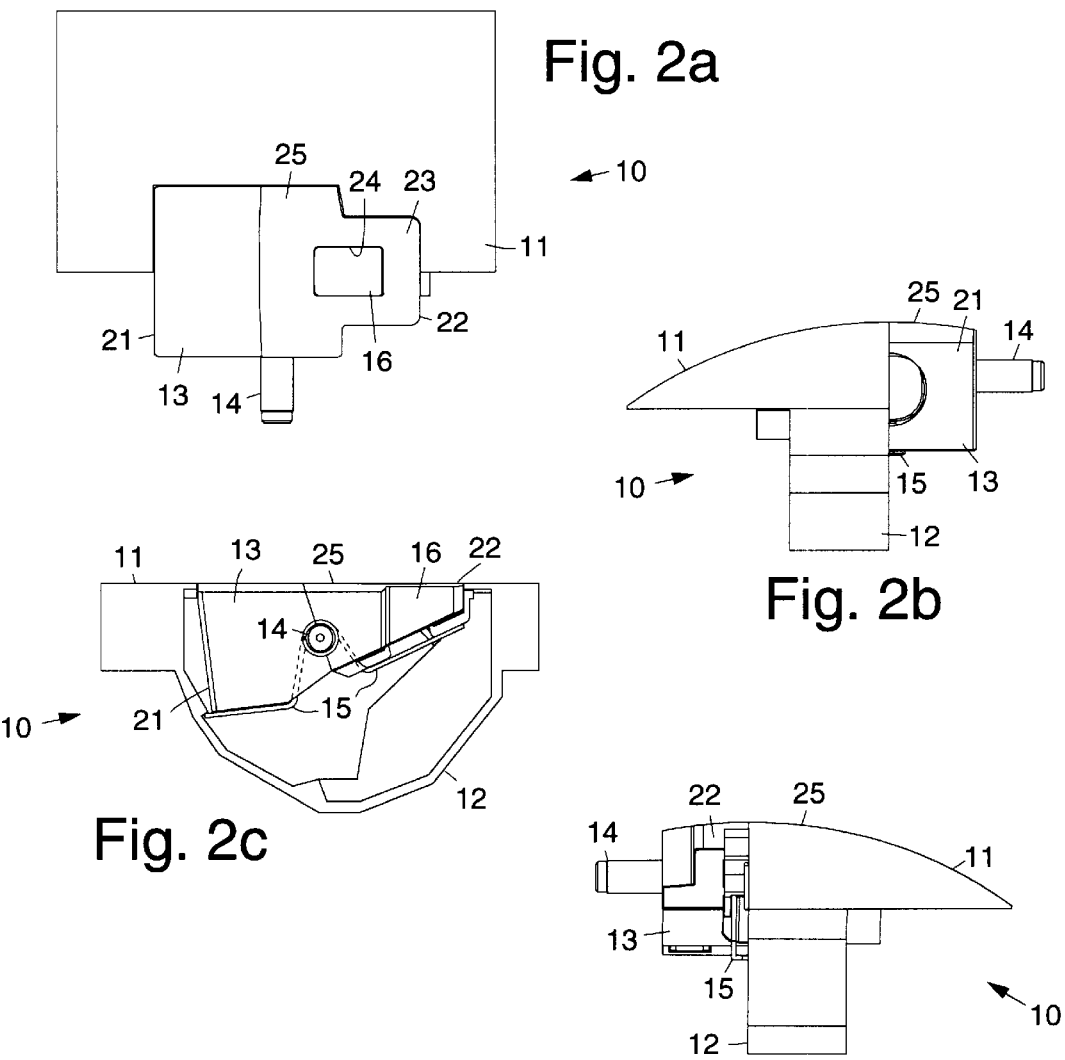
Fig. 2a
Fig. 2b
Fig. 2c
Fig. 2d

UNIVERSAL AIRCRAFT-CARRIAGE SUSPENSION LUG SYSTEM

BACKGROUND

The present invention relates generally to aircraft suspension systems for carrying jettisonable weapons or stores, such as missiles and the like, and more particularly, to a universal aircraft-carriage suspension lug system that secures such jettisonable weapons on or in an aircraft.

The universal aircraft-carriage suspension lug system was selected over known suspension systems to provide immediate tool-free and hand-selectable mechanical interoperability between the Panavia British Tornado GR. Mk1 and other aircraft as well as a post-jettison weapon faired body surface for minimum aerodynamic drag and low radar cross-section.

Historically, jettisonable weapons, such as missiles or other deployable weapons, for example, that are carried on aircraft, have used protruding threaded or bolted eye-type suspension lugs installed during the up-loading procedure. For most applications such as bombs and fuel tanks, for example, interoperability, aerodynamic drag and radar cross-section have not been major concerns as regards the lugs used therewith. For stand-off weapons, however, these characteristics are paramount and are addressed by the present invention.

With the advent of long-range cruise missiles, folding clevis-type lugs were incorporated in place of eye-type lugs, resulting in improved aerodynamic and radar cross-section performance. Interoperability was facilitated by the use of common ejector reaction units that accept a weapon equipped with 30-inch spaced clevis-type lugs.

To eliminate the use of ejector reaction unit sway-braces on the Panavia British Tornado aircraft, a "saddle" lug was developed. Interoperability was facilitated by the fact that the "saddle" and conventional eye-type lugs fit into an existing threaded well of a weapon. In either case, after jettison, it was acceptable for the lug to protrude into the air stream.

More recently, fixed and/or deployable fairings have been devised in an attempt to improve the aerodynamic and radar cross-section performance of weapons with protruding "saddle" and eye-type lugs. While fairings are an improvement over exposed lugs, nothing approaches the performance of an uninterrupted, smooth, body surface, which is provided by the present invention.

The British Tornado aircraft is equipped with a heavy duty ejector release unit used with a Minimum Area Crutchless Ejector. Currently, to prepare a weapon that is to be carried on the Tornado aircraft, a ground-crew must position the No. 56 Mk1 suspension lug (Ref. No. 12A/13-25-99-966-4060, M. L. Aviation Co. Ltd. drawing No. BZ 13641-40B). A special wrench is required to install and remove an attaching bolt. The lug is fixed and protrudes outside the contour of the weapon. It would be advantageous to have a lug system that eliminates the installation of the protruding saddle lug, the wrench and the associated ground-crew workload.

Other aircraft that use an ejector release unit having 30 inch-spaced hooks, are currently prepared for up-loading by installing a Mk. 3 MOD 0 Lug (NAVAIR Drawing 1380540, Ref. MIL-A-8591G (Amendment 5—August 1987). This threaded eye-type lug is installed by hand, without tools, and also protrudes outside the contour of the weapon. It would be advantageous to have a lug system that eliminates installation of the protruding eye-type lug and the associated ground-crew workload.

To facilitate interoperability between the Tornado aircraft that use the saddle lug, and another aircraft that use an eye-type lug, one must either postpone weapon preparation until the aircraft has been identified, or replace one type of lug with the other. It would be advantageous to have a lug system that eliminates preparation delays and/or ground-crew workload associated with the use of these conventional saddle and eye-type lugs.

Accordingly, it is an objective of the present invention to provide for a universal aircraft-carriage suspension lug system that secures jettisonable weapons, such as missiles, and the like, on or in an aircraft.

SUMMARY OF THE INVENTION

To meet the above and other objectives, the present invention provides for a universal aircraft-carriage suspension lug system that is a device that is incorporated into the body of a jettisonable weapon or store that is carried by an aircraft, and that deploys to provide a mechanical interface of the jettisonable weapon with an aircraft, such as the Panavia British Tornado GR. Mk1 and other aircraft. When released, the universal aircraft-carriage suspension lug system automatically retracts to preserve the outer contour of the weapon.

The universal aircraft-carriage suspension lug system comprises a dual-function lug that resides in a well in the weapon, and pivots on a transverse pin. One end of the lug incorporates primary features of a Tornado-aircraft-compatible "Saddle" lug, such as those manufactured by M.L. Aviation Ltd. The opposite end of the lug incorporates a "clevis" similar to a folding lug used on an AGM-129 Advanced Cruise Missile manufactured by General Dynamics-Convair. The clevis end of the suspension lug system is tailored to fit ejector release units having 30-inch hook spacing that are employed on a large number of aircraft.

The lug is spring loaded to return to a stowed position, and is faired to match the surface of the weapon. In the stowed position, a separate pivoting element serves to close the clevis eye opening. In a reduced to practice embodiment of the present invention, in the stowed position, the lug is approximately 4 inches wide, 6 inches long and 3 inches deep. The well is approximately 5 inches wide, 8 inches long and 6 inches deep.

The disadvantages in terms of aerodynamics and radar cross-section of the fixed and/or faired saddle lug currently used on a stand-off weapon launched from an aircraft, such as the Tornado aircraft, for example, are eliminated using the universal suspension lug system in accordance with the present invention. Disadvantages of known mechanical interface approaches are improved upon by the universal aircraft-carriage suspension lug system of the present invention. These improvements provided by the present invention include reduced ground-crew workload and a reduced number of tools required for weapon preparation, reduced aerodynamic drag and a reduction in radar cross-section, improved reliability and reduced cost.

The universal aircraft-carriage suspension lug system is intended for applications where immediate mechanical interoperability is a paramount requirement. If mechanical interoperability but not immediate mechanical interoperability is required, a "common-well" approach is suitable. However, there are support and ground-crew workload issues that are eliminated by using the present invention.

The term "interoperable" is normally used by operations personnel to characterize something (a system, subsystem, component, or part, for example) that can be used by any of the services (Air Force, Army, Navy, Marines). The present universal aircraft-carriage suspension lug system was created to accommodate the Tornado aircraft's unique Minimum Area Crutchless Ejector (MACE). Additionally, the lug system also was designed to by used on any aircraft that use a more conventional ejector having 30-inch hook spacing. Aircraft of this type are in the same service, and include the Jaguar GR Mk 1 used by the Royal Air Force. The Tornado is also in use with the Italian Air Force as well as the Federal German Air Force and Navy. The Jaguar is also in use with the French Air Force. The Euro-Fighter, which accepts the more conventional clevis lug, is anticipated to be used by several European countries.

The term "interoperability", as it is used herein, has been extended to encompass "other services" and "other countries". One might imagine a NATO operation involving aircraft from various services of several countries. The phrase "mechanical interoperability" is used to emphasize that, with the use of the universal lug system a weapon is physically compatible with the aircraft ejector but is not necessarily electrically and/or electronically compatible. The term "immediate mechanical interoperability" is used to emphasize that a weapon incorporating the universal aircraft-carriage suspension lug system may be up-loaded, down-loaded, or transferred from one aircraft to another, regardless of service or country, without reconfiguration, other than flipping the lugs to the appropriate position.

The universal aircraft-carriage suspension lug system provides for a weapon that is equipped with a self-contained, hand-deployable mechanical interface that permits the weapon to be loaded into a Tornado or other aircraft. Additionally, once the weapon is jettisoned, the universal lug is automatically stowed.

The universal aircraft-carriage suspension lug system enables the jettisonable weapon to have immediate mechanical interoperability with the Panavia British Tornado GR. Mk1 and other aircraft. Furthermore, use of the universal aircraft-carriage suspension lug system provides for increased aerodynamic performance and survivability of the jettisonable weapon.

The principal advantage of the present universal lug system is that the mechanical interface configuration, appropriate for a selected aircraft, can immediately be made available by hand-positioning the lug without tools. The use of the present invention improves the aerodynamic and radar cross-section performance of the weapon since the lugs automatically stow in a position that is flush with the surface of the weapon. Additional advantages are that the present invention provides enhanced supportability, requires fewer tools, and provides reduced ground crew workload and increased reliability.

The universal aircraft-carriage suspension lug system was specifically developed for use with an AirHawk missile used on the United Kingdom SR(A)1236 Conventionally Armed Stand Off Weapon (CASOM). The primary impact of the universal aircraft-carriage suspension lug system for the CASOM weapon is that a high-performance, highly-survivable weapon can be immediately mechanically interoperable for use with the Panavia British Tornado GR. Mk1 aircraft and Euro-Fighter (EF-2000) aircraft. Furthermore, the universal aircraft-carriage suspension lug system may be used with other weapons and aircraft, particularly where interoperability is important to broaden weapon use with a mixed fleet of aircraft.

The ultimate impact of the universal aircraft-carriage suspension lug system is that weapon preparation is simplified, ground crew workload is reduced, tools are eliminated, weapon aerodynamic performance and survivability are enhanced, reliability is increased and supportability is improved. These characteristics combine to reduce risk and cost associated with the weapon.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 illustrates perspective view of a an aircraft-launched weapon embodying universal aircraft-carriage suspension lug systems in accordance with the principles of the present invention;

FIGS. 2a–d show top, side and end views of the universal aircraft-carriage suspension lug system in a neutral or stowed position;

DETAILED DESCRIPTION

Figure 3:
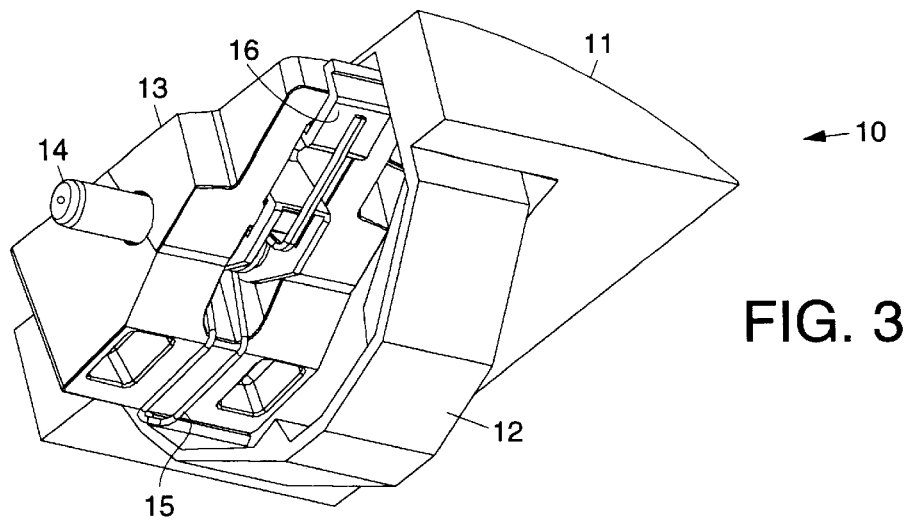
FIG. 3 shows a partially cutaway perspective view of the universal aircraft-carriage suspension lug system in a post-jettison stowed position.

Referring to the drawing figures, FIG. 1 illustrates an exemplary aircraft-launched weapon 30, or store 30, that employs a plurality of universal aircraft-carriage suspension lug systems 10 in accordance with the principles of the present invention. The weapon 30 has an additional pair of lugs 31 that are 14 inch-spaced clevis lugs 31 for use with different aircraft missile mounting systems. The additional pair of clevis lugs 31 are not discussed herein.

The universal aircraft-carriage suspension lug systems 10 have been specifically designed to provide an immediate mechanical interface between the weapon 30 and a Panavia British Tornado GR. Mk1, or Euro-Fighter EF-2000 aircraft, although the present system 10 may be used with other aircraft. The use of the universal aircraft-carriage suspension lug system 10 provides for increased aerodynamic performance and survivability of the weapon 30.

The universal aircraft-carriage suspension lug system 10 is a device that is disposed within a body of a jettisonable weapon 30 that is carried by an aircraft (not shown), such as a Panavia British Tornado GR. Mk1 or other aircraft, for example, and that deploys to provide a mechanical interface between the jettisonable weapon 30 and the aircraft. When released, the universal aircraft-carriage suspension lug system 10 automatically retracts to preserve the outer contour of the weapon 30.

Referring to FIGS. 2a–d, they show top, side and end views of the universal aircraft-carriage suspension lug system 10 in a neutral or stowed position. FIG. 3 shows a partially cutaway perspective view of the universal aircraft-carriage suspension lug system 10 in a post-jettison stowed position.

The universal aircraft-carriage suspension lug system 10 comprises a dual-function lug 13 that resides in a well 12 and pivots in opposite directions on a transverse pivot pin 14. A first end 21 of the lug 13 is configured to have features of a Tornado-compatible saddle lug, such as one manufactured by M. L. Aviation Ltd. A second or opposite end 22 (or clevis end 22) of the lug 13 incorporates a clevis 23 having a configuration similar to a folding lug used on an AGM-129 Advanced Cruise Missile manufactured by General Dynamics-Convair.

The clevis end 22 is configured with an opening 24 that fits ejector release units (not shown) disposed on the aircraft having 30-inch hook spacing, and that are used on a large number of aircraft. The lug 13 is spring loaded by means of a spring 15 to return it to its stowed position (shown in FIGS. 2a–2d), and is faired to match the outer surface 11 of the weapon 30. In the stowed position, a plug 16 serves to close the opening 24 in the clevis 23.

In the stowed position shown in FIGS. 2a–2d and 3, the lug 13 is approximately 4 inches wide, 6 inches long and 3 inches deep. The well 12 is approximately 5 inches wide, 8 inches long and 6 inches deep.

As is illustrated in FIGS. 2a–d and 3, the universal system 10, in as-delivered and post-Jettison stowed positions, has a faired outer surface 25 that matches the outside surface 11 of the weapon 30. The faired outer surface 25 provides for increased aerodynamic performance and increased survivability of the weapon 30. When the lug 13 is released, the captured preloaded spring 15 automatically returns it to and holds it in the neutral or stowed position, thus restoring the outer contour of the weapon 30 to its original shape.

Figure 5:
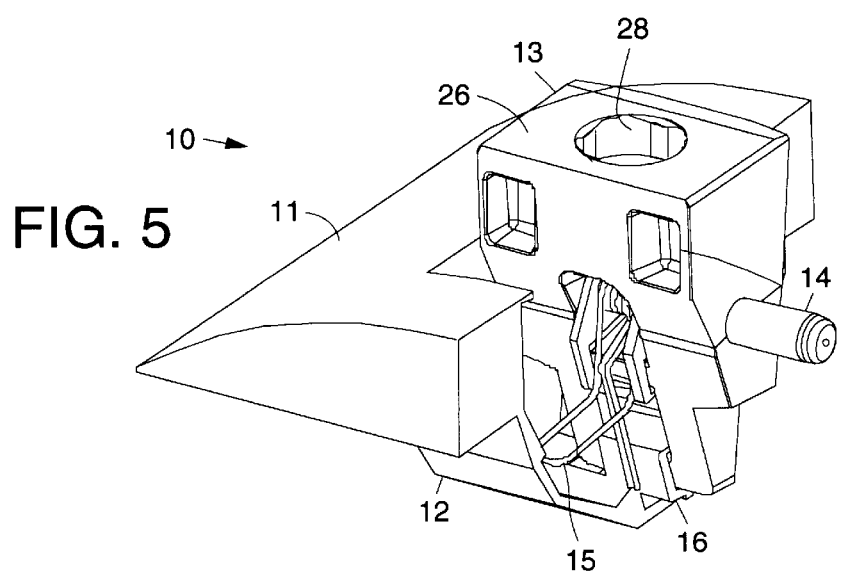
FIG. 5 shows a perspective view of a saddle-equivalent mechanical interface provided by the present universal aircraft-carriage suspension lug system.

FIGS. 4a–d shows the universal aircraft-carriage suspension lug system 10 after deployment in a saddle-deployed position. FIG. 5 shows a perspective view of a saddle-equivalent mechanical interface 26 provided by the universal aircraft-carriage suspension lug system 10. More specifically, FIGS. 4a–d and 5 show the universal lug system 10 after being hand-deployed and illustrates the saddle-equivalent mechanical interface 26 for a Panavia British Tornado aircraft, for example, provided by the lug system 10. The saddle-equivalent mechanical interface 26 has two horizontally oriented openings 27 disposed therein (when configured in the saddle-deployed position) that are used to engage a pair of suspension hooks (not shown) that are part of the ejector release unit disposed on the aircraft. The saddle-equivalent mechanical interface 26 also has a vertically oriented opening 28 (when configured in the saddle-deployed position) that is used to engage a spigot (not shown) on the ejector release unit.

Figure 7:
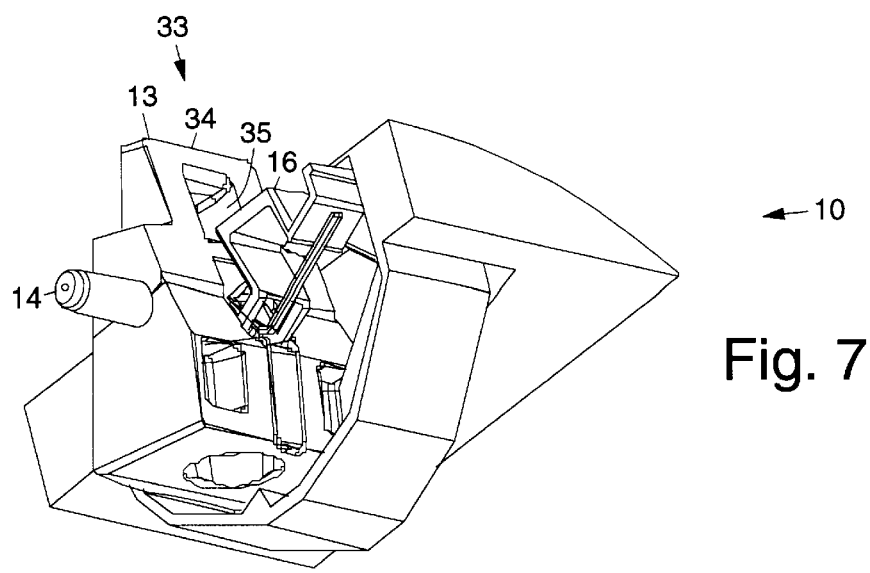
FIG. 7 shows a perspective view of a clevis type mechanical interface provided by the present universal aircraft-carriage suspension lug system for use with an aircraft having 30-inch spaced levis lugs.
Figure 4A:
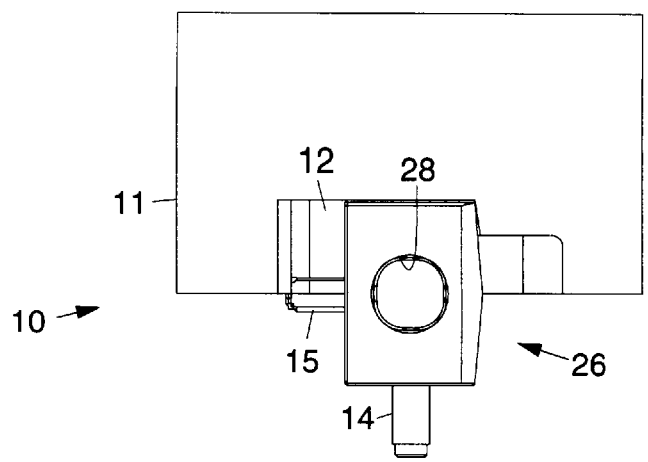
FIGS. 4a–d shows the universal aircraft-carriage suspension lug system after deployment in a saddle-deployed position.
Figure 4B:
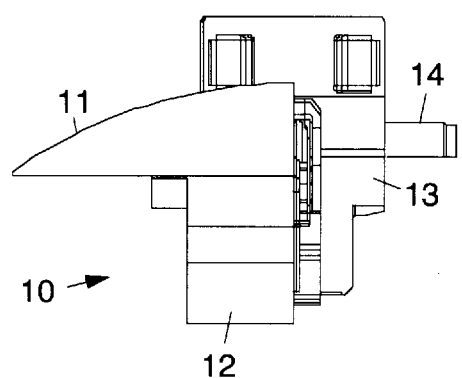
Figure 4C:
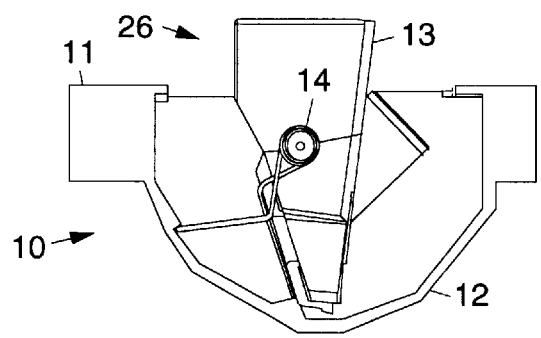
Figure 4D:
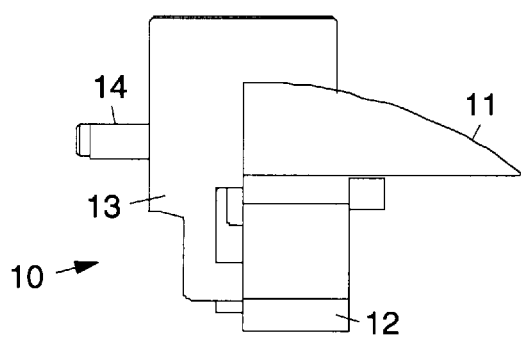
Figure 6A:
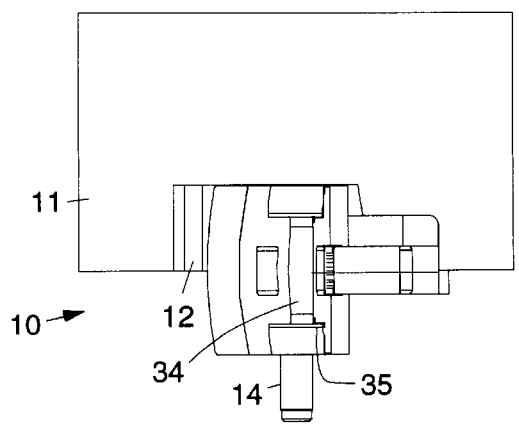
FIGS. 6a–d shows the universal aircraft-carriage suspension lug system after deployment in a clevis-deployed position.
Figure 6B:
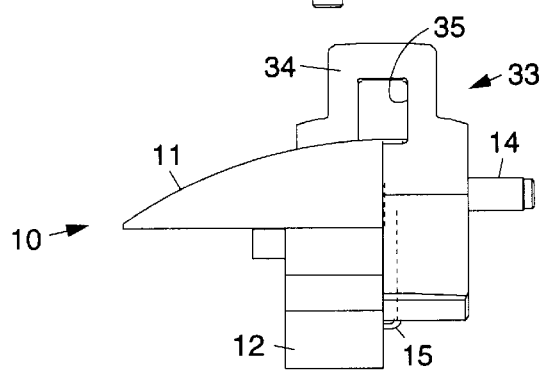
Figure 6C:
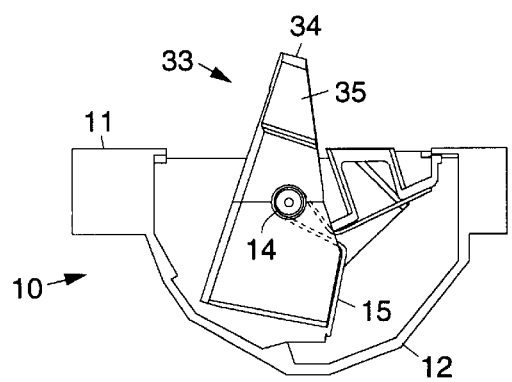
Figure 6D:
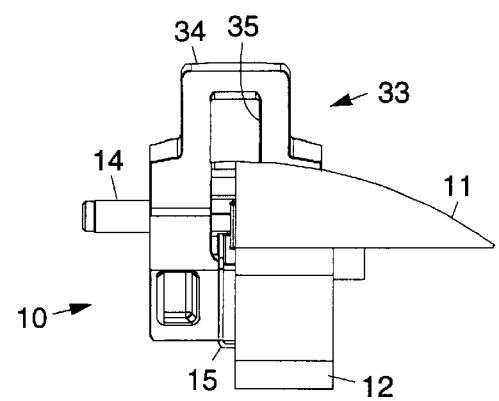

FIGS. 6a–d shows the universal aircraft-carriage suspension lug system 10 after deployment in a clevis-deployed position. FIG. 7 shows a perspective view of a clevis type mechanical interface 33 provided by the universal aircraft-carriage suspension lug system 10 for use with an aircraft having 30-inch spaced clevis lugs, such as an Euro-Fighter EF-2000 aircraft for example. The clevis type mechanical interface 33 has a clevis 34 that is exposed when the clevis type mechanical interface 33 is deployed. The clevis 34 has a hole 35 disposed therein that is configured to accept a hook (not shown) disposed on the aircraft. The hole 35 mates with the plug 16 when the suspension lug system 10 is in the stowed position.

Thus, a universal aircraft-carriage suspension lug system has been disclosed that secures jettisonable weapons or stores to a multiplicity of aircraft. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A universal aircraft-carriage suspension lug system for use with a jettisonable weapon, said lug system providing a mechanical interface between the jettisonable weapon and a multiplicity of aircraft, said system comprising:

a dual-function lug that is disposed in a well below an outer surface of the system and weapon, when in a stowed position, and that is pivotable in opposite directions on a transverse pivot pin, wherein a first end of the lug comprises a saddle lug that is exposed above the outer surface when the lug is rotated into a saddle deployed position, and wherein a second end of the lug comprises a clevis having an opening that is exposed above the outer surface when the lug is rotated into a clevis-deployed position, and a spring coupled to the lug to spring load it and return it to a stowed position when it is not engaged with an ejector release unit to preserve the outer contour of the weapon.

2. The lug system of claim 1 wherein the second end comprises a plug for closing the opening in the clevis when the lug is returned to a stowed position.

3. The lug system of claim 1 wherein the outer surface of the lug is faired to match the surface of the weapon.

4. The lug system of claim 1 wherein the mechanical interface on the saddle end of the dual-function lug comprises:

two horizontally oriented openings disposed therein that are used to engage suspension hooks that are part of the ejector release unit disposed on the aircraft; and a vertically oriented opening that is used to engage a spigot on the ejector release unit.

5. The lug system of claim 1 wherein the mechanical interface on the clevis end of the dual-function lug comprises the clevis that is exposed when the mechanical interface is deployed, and wherein the opening disposed therein is configured to accept a hook disposed on the aircraft, and wherein the opening mates with a plug when the suspension lug system is in a stowed position.

* * * * *